(12) United States Patent
Li et al.

(10) Patent No.: US 11,843,314 B2
(45) Date of Patent: Dec. 12, 2023

(54) PFC CIRCUIT WITH AUXILIARY SWITCH TUBE AND CONTROL METHOD THEREOF

(71) Applicant: Huayuan semiconductor (shenzhen) limited company, Shenzhen (CN)

(72) Inventors: Linkai Li, Shenzhen (CN); Chunming Guo, Shenzhen (CN); Peng Hu, Shenzhen (CN)

(73) Assignee: Huayuan semiconductor (shenzhen) limited company, Shenzhen (CN)

( * ) Notice: Subject to any disclaimer, the term of this patent is extended or adjusted under 35 U.S.C. 154(b) by 90 days.

(21) Appl. No.: 17/583,273

(22) Filed: Jan. 25, 2022

(65) Prior Publication Data
US 2022/0255422 A1 Aug. 11, 2022

(30) Foreign Application Priority Data
Feb. 5, 2021 (CN) .......................... 202110156923.6

(51) Int. Cl.
*H02M 1/42* (2007.01)

(52) U.S. Cl.
CPC ....... *H02M 1/4225* (2013.01); *H02M 1/4266* (2013.01)

(58) Field of Classification Search
CPC .......................... H02M 1/4225; H02M 1/4266
See application file for complete search history.

(56) References Cited

U.S. PATENT DOCUMENTS

| 5,614,810 A * | 3/1997 | Nostwick | H02M 1/4225 323/300 |
| 6,018,469 A * | 1/2000 | Poon | H02M 1/34 363/20 |
| 2017/0373592 A1* | 12/2017 | Takahashi | H02M 3/07 |

FOREIGN PATENT DOCUMENTS

CN 1200594 A 12/1998

* cited by examiner

*Primary Examiner* — Jue Zhang
*Assistant Examiner* — Lakaisha Jackson
(74) *Attorney, Agent, or Firm* — Bayramoglu Law Offices LLC (57) ABSTRACT

A PFC circuit includes: a boost inductor, an auxiliary winding, an auxiliary switch tube, a main switch tube, a clamping capacitor, a series resistor and a control module; the boost inductor and the auxiliary winding have mutual inductance, a first terminal of the auxiliary winding is connected to a first terminal of the auxiliary switch tube, a second terminal of the auxiliary switch tube is connected to a first terminal of the clamping capacitor, a second terminal of the clamping capacitor is connected to a first terminal of the series resistor, and a second terminal of the series resistor is connected to a second terminal of the auxiliary winding; the main switch tube is connected between the boost inductor and the ground; and the control module is respectively connected to a control terminal of the main switch tube and a control terminal of the auxiliary switch tube.

17 Claims, 9 Drawing Sheets

PFC CIRCUIT WITH AUXILIARY SWITCH TUBE AND CONTROL METHOD THEREOF

CROSS REFERENCE TO THE RELATED APPLICATIONS

This application is based upon and claims priority to Chinese Patent Application No. 202110156923.6, filed on Feb. 5, 2021, the entire contents of which are incorporated herein by reference.

TECHNICAL FIELD

The present disclosure relates to the field of converters, in particular to a PFC circuit and a control method thereof.

BACKGROUND

The PFC circuit may be understood as the use of a power factor correction (PFC) circuit, wherein the PFC circuit can specifically implement boost-type power factor correction. At the same time, the PFC circuit can have multiple working modes, such as a CRM mode and a DCM mode.

The PFC circuit can include a boost inductor and a main switch tube; in the CRM mode, when a bus voltage of the PFC circuit is higher (for example, greater than half of an output voltage), through the control over the main switch tube, only a bottom switching function can be achieved (that is, the main switch tube is controlled to be turned on when a source-drain voltage of the main switch tube is at the bottom). Since the bus voltage is higher, the source-drain voltage does not reach zero when at the bottom. Furthermore, the control over the main switch tube cannot realize the function of zero voltage switching (that is, the main switch tube is controlled to be turned on when the source-drain voltage of the main switch tube is at zero).

Furthermore, since the function of zero voltage switching cannot be realized in the full voltage range of a bus, the conversion efficiency of the PFC circuit will be adversely affected, and the lower conversion efficiency may be caused.

SUMMARY

The present disclosure provides a PFC circuit and a control method thereof to solve the problem that the conversion efficiency of the PFC circuit will be adversely affected, and the lower conversion efficiency may be caused.

According to a first aspect of the present disclosure, a PFC circuit is provided and includes: a boost inductor, an auxiliary winding, an auxiliary switch tube, a main switch tube, a clamping capacitor, a series resistor and a control module; wherein the boost inductor and the auxiliary winding have mutual inductance, a first terminal of the auxiliary winding is connected to a first terminal of the auxiliary switch tube, a second terminal of the auxiliary switch tube is connected to a first terminal of the clamping capacitor, a second terminal of the clamping capacitor is connected to a first terminal of the series resistor, and a second terminal of the series resistor is connected to a second terminal of the auxiliary winding; the main switch tube is connected between the boost inductor and ground; the control module is respectively connected to a control terminal of the main switch tube and a control terminal of the auxiliary switch tube; wherein a state change of the auxiliary switch tube is related to a state change of the main switch tube.

Optionally, the PFC circuit further includes: a rectifier module, an input capacitor, an output diode, and an output capacitor; wherein
an input side of the rectifier module is configured to connect to a power source; an output side of the rectifier module is connected to a first terminal of the boost inductor and a first terminal of the input capacitor, a second terminal of the input capacitor is grounded, a second terminal of the boost inductor is connected to a positive electrode of the output diode and a drain electrode of the main switch tube, a source electrode of the main switch tube is grounded through a sampling resistor, and a negative electrode of the output diode is connected to the output capacitor and a load; and
a detection terminal of the control module is also connected between the main switch tube and the boost inductor to collect a corresponding zero-crossing detection voltage.

Optionally, power supply of the control module is provided by electric energy obtained by the auxiliary winding.

Optionally, the control module is configured to:
when the auxiliary switch tube is kept off, control the auxiliary switch tube to turn on according to a turn-off action of the main switch tube; and when the auxiliary switch tube is kept on, control the auxiliary switch tube to turn off according to a current of the boost inductor.

Optionally, the control module is specifically configured to:
under the condition that the PFC circuit is in a CRM mode, then:
after the auxiliary switch tube is kept off and the main switch tube is controlled to be turned off, wait for a first time length, and then control the auxiliary switch tube to turn on; and
when the main switch tube is kept off and the auxiliary switch tube is kept on, control the auxiliary switch tube to turn off according to the current of the boost inductor.

Optionally, when controlling the auxiliary switch tube to turn off according to the current of the boost inductor in the CRM mode, the control module is specifically configured to:
after detecting a zero-crossing current of the boost inductor, wait for a second time length, and control the auxiliary switch tube to turn off.

Optionally, the control module is specifically configured to:
under the condition that the PFC circuit is in a DCM mode, then:
after the auxiliary switch tube is kept off and the main switch tube is controlled to be turned off, control the auxiliary switch tube to turn on according to a source-drain voltage of the main switch tube; and
when the main switch tube is kept off and the auxiliary switch tube is kept on, control the auxiliary switch tube to turn off according to the current of the boost inductor.

Optionally, when controlling the auxiliary switch tube to turn on according to the source-drain voltage of the main switch tube, the control module is specifically configured to:
when detecting that the source-drain voltage oscillates for N bottoms and rises to a threshold voltage, control the auxiliary switch tube to turn on.

Optionally, the threshold voltage is matched with an input voltage input to the boost inductor.

Optionally, when controlling the auxiliary switch tube to turn off according to the current of the boost inductor in the DCM mode, the control module is specifically configured to:

after detecting the zero-crossing current of the boost inductor, wait for a third time length, and control the auxiliary switch tube to turn off.

According to a second aspect of the present disclosure, a control method for the PFC circuit according to the first aspect and optional solutions thereof is provided and includes:

controlling, when the auxiliary switch tube is kept off, the auxiliary switch tube to turn on according to the turn-off action of the main switch tube; and controlling, when the auxiliary switch tube is kept on, the auxiliary switch tube to turn off according to the current of the boost inductor.

Optionally, controlling, when the auxiliary switch tube is kept off, the auxiliary switch tube to turn on according to the turn-off action of the main switch tube includes:

under the condition that the PFC circuit is in the CRM mode, then:

Waiting for the first time length after the auxiliary switch tube is kept off and the main switch tube is controlled to be turned off, and controlling the auxiliary switch tube to turn on.

Optionally, controlling, when the auxiliary switch tube is kept on, the auxiliary switch tube to turn off according to the current of the boost inductor includes:

under the condition that the PFC circuit is in the CRM mode, then:

controlling, when the main switch tube is kept off and the auxiliary switch tube is kept on, the auxiliary switch tube to turn off according to the current of the boost inductor.

Optionally, controlling, when the PFC circuit is in the CRM mode, the auxiliary switch tube to turn off according to the current of the boost inductor includes:

waiting for the second time length after detecting the zero-crossing current of the boost inductor, and controlling the auxiliary switch tube to turn off.

Optionally, controlling, when the auxiliary switch tube is kept off, the auxiliary switch tube to turn on according to the turn-off action of the main switch tube includes:

under the condition that the PFC circuit is in the DCM mode, then:

controlling, after the auxiliary switch tube is kept off and the main switch tube is controlled to be turned off, the auxiliary switch tube to turn on according to the source-drain voltage of the main switch tube.

Optionally, controlling the auxiliary switch tube to turn on according to the source-drain voltage of the main switch tube includes:

controlling, when detecting that the source-drain voltage oscillates for N bottoms and rises to a threshold voltage, the auxiliary switch tube to turn on.

Optionally, controlling, when the auxiliary switch tube is kept on, the auxiliary switch tube to turn off according to the current of the boost inductor includes:

waiting for the third time length after detecting the zero-crossing current of the boost inductor, and controlling the auxiliary switch tube to turn off.

In the PFC circuit and the control method thereof according to the present disclosure, through the mutual inductance between the auxiliary winding and the boost inductor, electric energy of the boost inductor can be coupled to the auxiliary winding, through appropriate control (for example, the control method of the optional solutions of the present disclosure is adopted), the function of zero voltage switching can be effectively guaranteed, and a higher conversion efficiency is guaranteed in the full voltage range. It can be seen that the present disclosure provides a circuit basis for realizing such a function.

BRIEF DESCRIPTION OF THE DRAWINGS

In order to illustrate the technical solutions in the embodiments according to the present disclosure or in the prior art more clearly, a brief introduction may be given hereinafter to the accompany drawings required to be used in the description of the embodiments or the prior art. Apparently, the accompany drawings in the description below are merely some embodiments of the present disclosure, and other accompany drawings may be obtained by those of ordinary skilled in the art according to these accompany drawings without paying any creative labor.

DESCRIPTION OF REFERENCE SIGNS

11—control module;
12—EMI filter;
13—rectifier module;
$L_b$—boost inductor;
$Q_b$—main switch tube;
$L_{aux}$—auxiliary winding;
$Q_{aux}$—auxiliary switch tube;
$C_{aux}$—clamping capacitor;
$R_{aux}$—series resistor;
$C_{in}$—input capacitor;
$D_b$—output diode;
$C_o$—output capacitor;
$R_s$—sampling resistor;
$C_1$—capacitor;
$D_1$—diode;
$R_L$—load.

DETAILED DESCRIPTION OF THE EMBODIMENTS

The technical solutions in the embodiments of the present disclosure will be dearly and completely described below in conjunction with the accompanying drawings in the embodiments of the present disclosure. It is obvious that the described embodiments are only part but not all of the embodiments of the present disclosure. All other embodiments obtained by those skilled in the art without creative efforts based on the embodiments in the present disclosure are within the protection scope of the present disclosure.

The terms "first", "second", "third", "fourth", and the like (if any) In the description and claims of the present disclosure and the above-mentioned drawings are configured to distinguish similar objects, without necessarily describing a specific order or sequence. It should be understood that the data used in this way may be interchanged under appropriate circumstances, so that the embodiments of the present disclosure described herein can be implemented in a sequence other than those illustrated or described herein. In addition, the terms "includes" and "has" and any variations thereof are intended to cover non-exclusive inclusions. For example, the processes, methods, systems, products, or devices that include a series of steps or units are not necessarily limited to those clearly listed steps or units, and may include other steps or units that are not clearly listed or are inherent to these processes, methods, products, or devices.

The technical solutions of the present disclosure will be described in detail below with specific embodiments. The following several specific embodiments may be combined with each other, and the same or similar concepts or processes may not be repeated in some embodiments.

The embodiments of the present disclosure provide a PFC circuit and a control method thereof.

Figure 1:
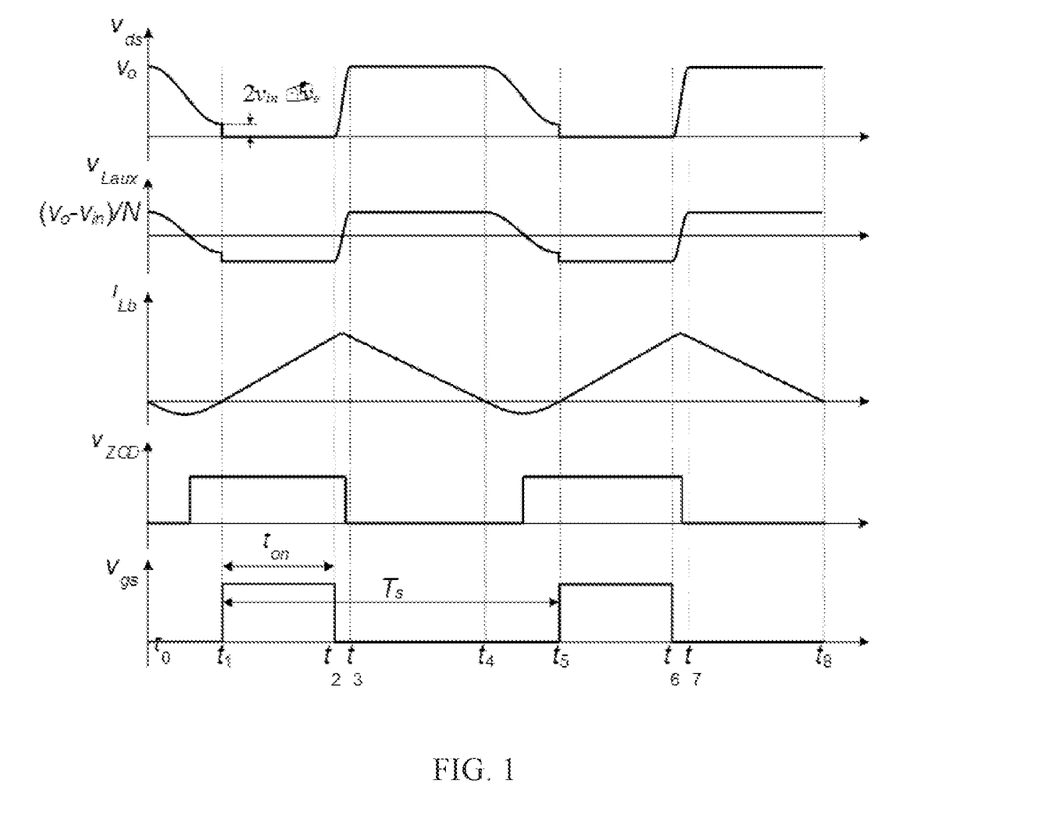
FIG. 1 is a waveform schematic diagram in an FPC circuit different from the present disclosure.

Compared with the solutions of the embodiments of the present disclosure, please refer to FIG. 1, in some technologies, when a bus voltage of the PFC circuit is higher (for example, greater than half of an output voltage), when a current $i_{Lb}$ of a main switch tube in the PFC circuit crosses zero and a source-drain voltage $V_{ds}$ of the main switch tube reaches the bottom, the main switch tube can be turned on by controlling a gate electrode voltage of the main switch tube (that is, a gate-source voltage $V_{gs}$). At this time, the source-drain voltage $V_{ds}$ of the main switch tube does not reach the zero-point voltage, and the difference may be, for example, 2Vin-Vo as shown in FIG. 1.

Furthermore, in this solution, when an input voltage Vin of a boost inductor in the PFC circuit exceeds half of the output voltage Vo, the function of zero voltage switching cannot be realized. It can be seen that in such type of solutions, the function of zero voltage switching cannot be realized in the full voltage range of a bus, the conversion efficiency of the PFC circuit will be adversely affected, and the lower conversion efficiency may be caused.

Figure 2:
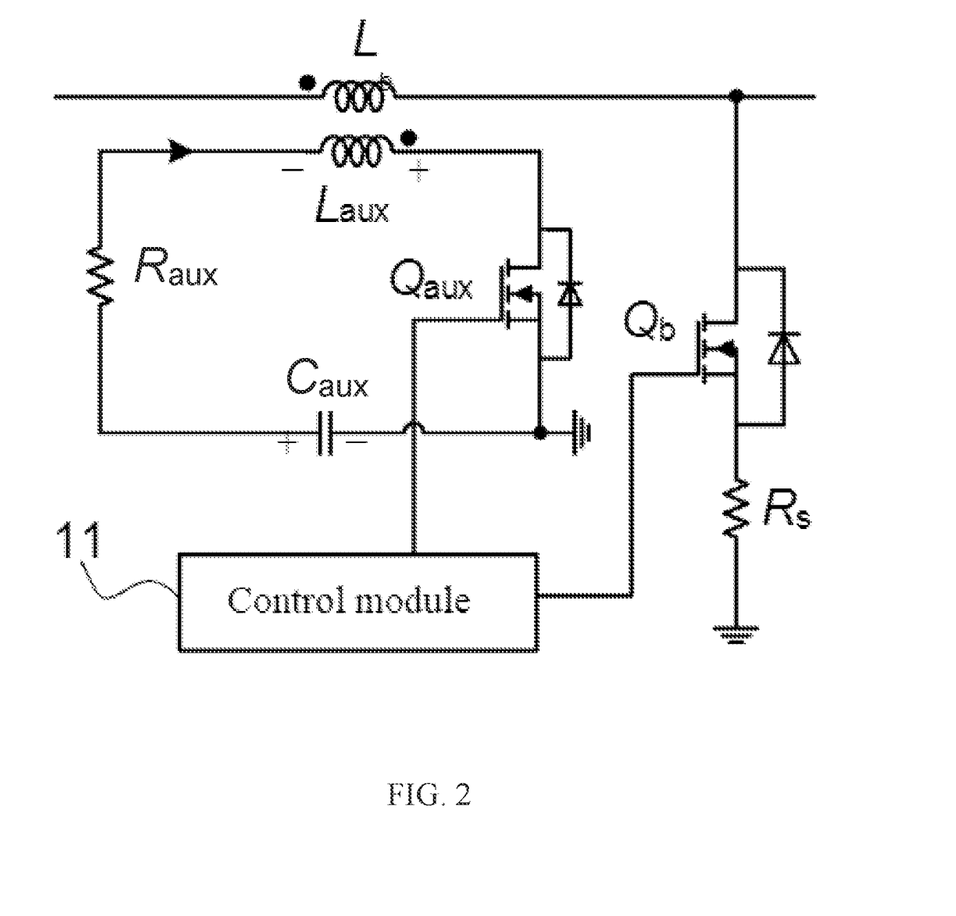
FIG. 2 is a schematic diagram of a partial circuit of a PFC circuit in an embodiment of the present disclosure.

Compared with this solution, the embodiment of the present disclosure provides the solution shown in FIG. 2 and further provides the solutions shown in FIG. 3 to FIG. 7.

Figure 3:
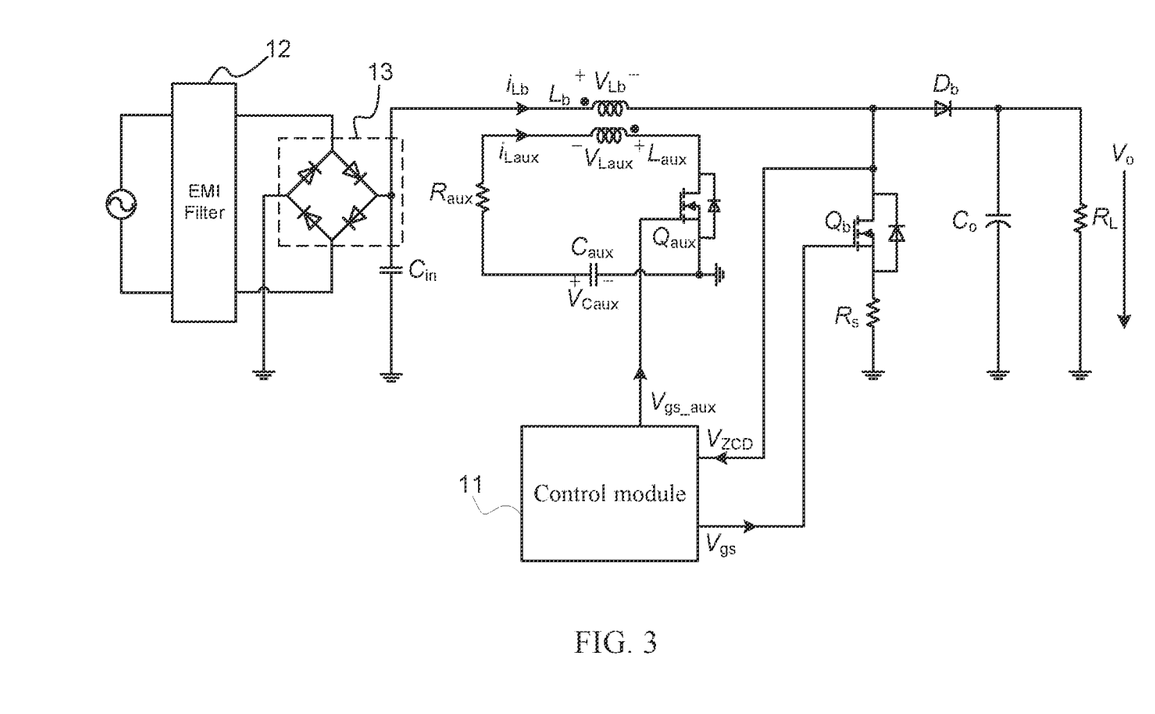
FIG. 3 is a first circuit schematic diagram of a PFC circuit in an embodiment of the present disclosure.

Please refer to FIG. 2 and FIG. 3, a PFC circuit is provided and includes: a boost inductor $L_b$, an auxiliary winding $L_{aux}$, an auxiliary switch tube $Q_{aux}$, a main switch tube $Q_b$, a clamping capacitor $C_{aux}$, a series resistor $R_{aux}$, and a control module 11.

The boost inductor $L_b$ and the auxiliary winding $L_{aux}$ have mutual inductance, which may be understood as: electrical energy of the boost inductor $L_b$ may be induced to the auxiliary winding $L_{aux}$, and electrical energy of the auxiliary winding $L_{aux}$ may also be induced to the boost inductor $L_b$, through appropriate charging and discharging control (for example, a circuit suitable for charging and discharging, and a corresponding control process are configured), a required control purpose can be achieved.

In the embodiment of the present disclosure, a first terminal of the auxiliary winding $L_{aux}$ is connected to a first terminal of the auxiliary switch tube $Q_{aux}$, a second terminal of the auxiliary switch tube $Q_{aux}$ is connected to a first terminal of the clamping capacitor $C_{aux}$, a second terminal of the clamping capacitor $C_{aux}$ is connected to a first terminal of the series resistor $R_{aux}$, and a second terminal of the series resistor $R_{aux}$ is connected to a second terminal of the auxiliary winding $L_{aux}$.

The auxiliary switch tube $Q_{aux}$ may be an NMOS tube, of which the first terminal is a drain electrode, the second terminal is a source electrode, and a control terminal is a gate electrode. At the same time, the auxiliary switch tube $Q_{aux}$ may have a body diode. In other optional solutions, the auxiliary switch tube $Q_{aux}$ may also adopt a triode or other forms of switching devices. The first terminal of the clamping capacitor $C_{aux}$ may be a negative electrode of the clamping capacitor $C_{aux}$, and the second terminal thereof may be a positive electrode of the clamping capacitor $C_{aux}$.

The main switch tube $Q_b$ is connected between the boost inductor $L_b$ and the ground (specifically, between an output terminal of the boost inductor $L_b$ and the ground). The control module 11 is respectively connected to a control terminal of the main switch tube and the control terminal of the auxiliary switch tube.

The main switch tube $Q_b$ may be an NMOS tube, of which a first terminal is a drain electrode, a second terminal is a source electrode, and the control terminal is a gate electrode. At the same time, the main switch tube $Q_b$ may have a body diode. In other optional solutions, the main switch tube $Q_b$ may also adopt a triode or other forms of switching devices.

A state change of the auxiliary switch tube is related to a state change of the main switch tube. The specific relevance may be understood with reference to relevant illustration of the control method below.

It can be seen that in the above solution, through the mutual inductance between the auxiliary winding and the boost inductor, the electric energy of the boost inductor can be coupled to the auxiliary winding, through appropriate control (for example, the control method of the optional solutions of the present disclosure is adopted), the function of zero voltage switching can be effectively guaranteed, and a higher conversion efficiency is guaranteed in the full voltage range. It can be seen that the present disclosure provides a circuit basis for realizing such a function.

In one of the embodiments, please refer to FIG. 3, the PFC circuit further includes: a rectifier module 13, an input capacitor $C_o$, an output diode $D_b$ (which may also be understood as a Boost diode), and an output capacitor $C_o$.

An input side of the rectifier module 13 is configured to connect to a power source; the connected power source may be, for example, input after AC power $V_{ac}$ is filtered by an EMI filter 12. The rectifier module 13 may adopt a full-wave rectifier bridge. At the same time, the embodiment of the present disclosure does not exclude no implementation of filtering, or adopts other manners of filtering and rectifying.

An output side of the rectifier module 13 is connected to a first terminal of the boost inductor $L_b$ and a first terminal of an input capacitor $C_{in}$. A second terminal of the input capacitor $C_{in}$ is grounded. Correspondingly, a voltage input to the boost inductor $L_b$ may be characterized as $V_{in}$, a current thereof may be characterized as $i_{Lb}$, and the voltage formed by acting on the boost inductor $L_b$ is $V_{Lb}$.

A second terminal of the boost inductor $L_b$ is connected to a positive electrode of the output diode $D_b$ and the drain electrode of the main switch tube $Q_b$. The source electrode of the main switch tube $Q_b$ is grounded through a sampling resistor $R_s$. A negative electrode of the output diode $D_b$ is connected to the output capacitor $C_o$ and a load $R_L$ (characterized by a resistor in the figure). A negative electrode of the output capacitor $C_o$ may be grounded, and the output capacitor $C_o$ may be a polar capacitor, and generally adopts an electrolytic capacitor.

A detection terminal of the control module 11 is also connected between the main switch tube $Q_b$ and the boost inductor $L_b$ (specifically connected to the drain electrode of the main switch tube $Q_b$) to collect a zero-crossing detection voltage $V_{ZCD}$.

Through the above circuit, it can provide a basis for the control process involved in the following.

Figure 4:
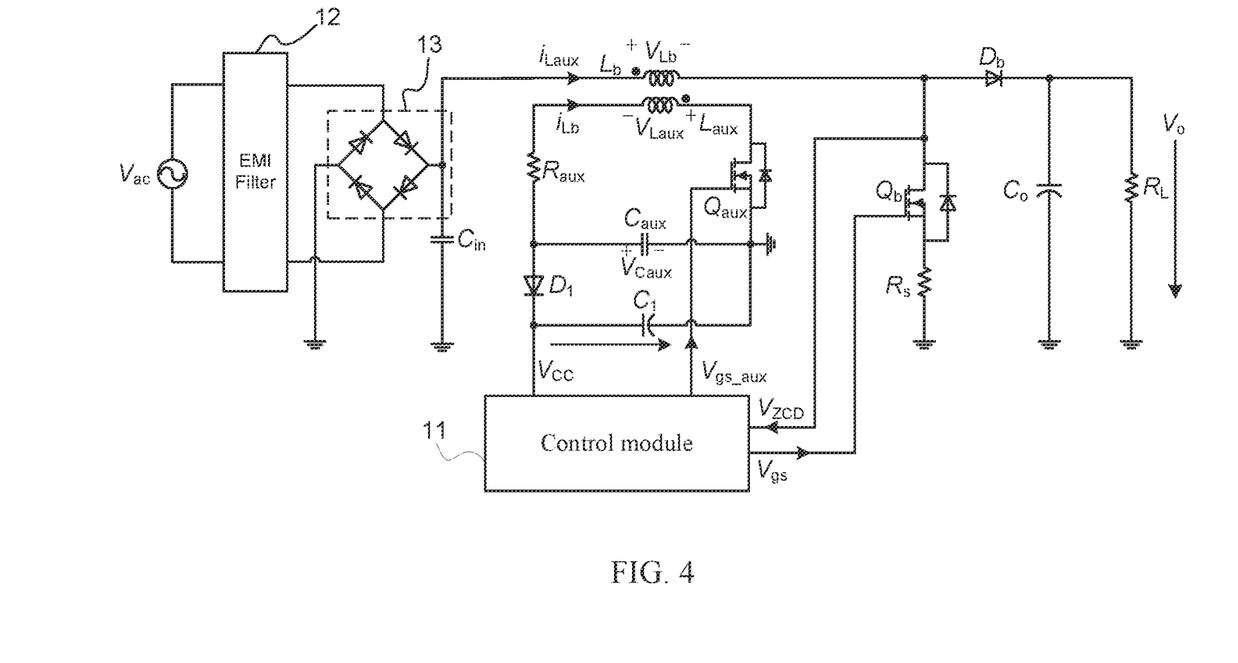
FIG. 4 is a second circuit schematic diagram of a PFC circuit in an embodiment of the present disclosure.

In a further solution, please refer to FIG. 4, power supply of the control module 11 is provided by the electric energy obtained by the auxiliary winding $L_{aux}$. Specifically, the first terminal (for example, its negative electrode) of the clamping capacitor $C_{aux}$ may be grounded, and the second terminal (for example, its positive electrode) of the clamping capacitor $C_{aux}$ may be connected to a power supply terminal of the control module via the diode $D_1$. Specifically, a positive electrode of the diode $D_1$ is connected to the second terminal of the clamping capacitor $C_{aux}$, and at the same time, capacitors $C_1$ may be connected in parallel with the two ends of the clamping capacitor $C_{aux}$ through the diode $D_1$ to form a power supply voltage $V_{CC}$ to supply power to the control module 11.

In the circuit not shown in FIG. 4, the power supply voltage $V_{CC}$ of the control module 11 may not be provided by the auxiliary winding. For example, the power may be taken from an input side or output side of the boost inductor $L_b$ to supply power to the control module 11, or may be taken from other external circuits to supply power to the control module 11.

Figure 5:
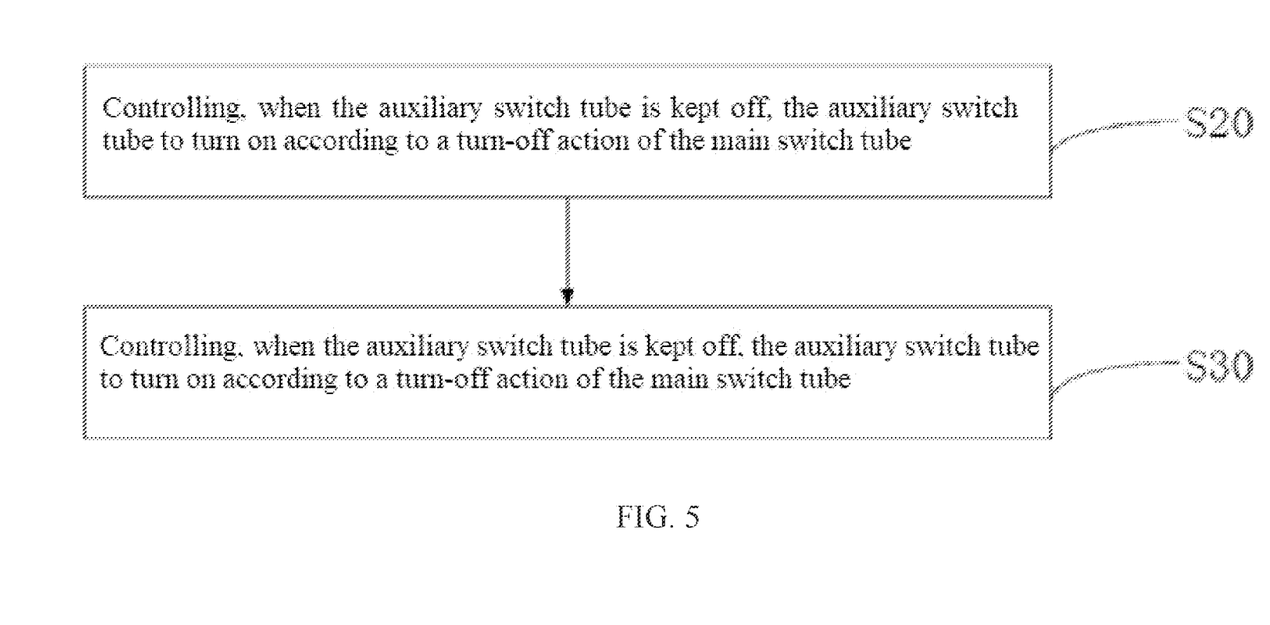
FIG. 5 is a first schematic flowchart of a control method for a PFC circuit in an embodiment of the present disclosure.

In one of the embodiments, the control module 11 may be configured to implement a control method for a PFC circuit. Please refer to FIG. 5, the method may include:

S20: controlling, when the auxiliary switch tube is kept off, the auxiliary switch tube to turn on according to the turn-off action of the main switch tube; and S30: controlling, when the auxiliary switch tube is kept on, the auxiliary switch tube to turn off according to the current of the boost inductor.

Figure 6:
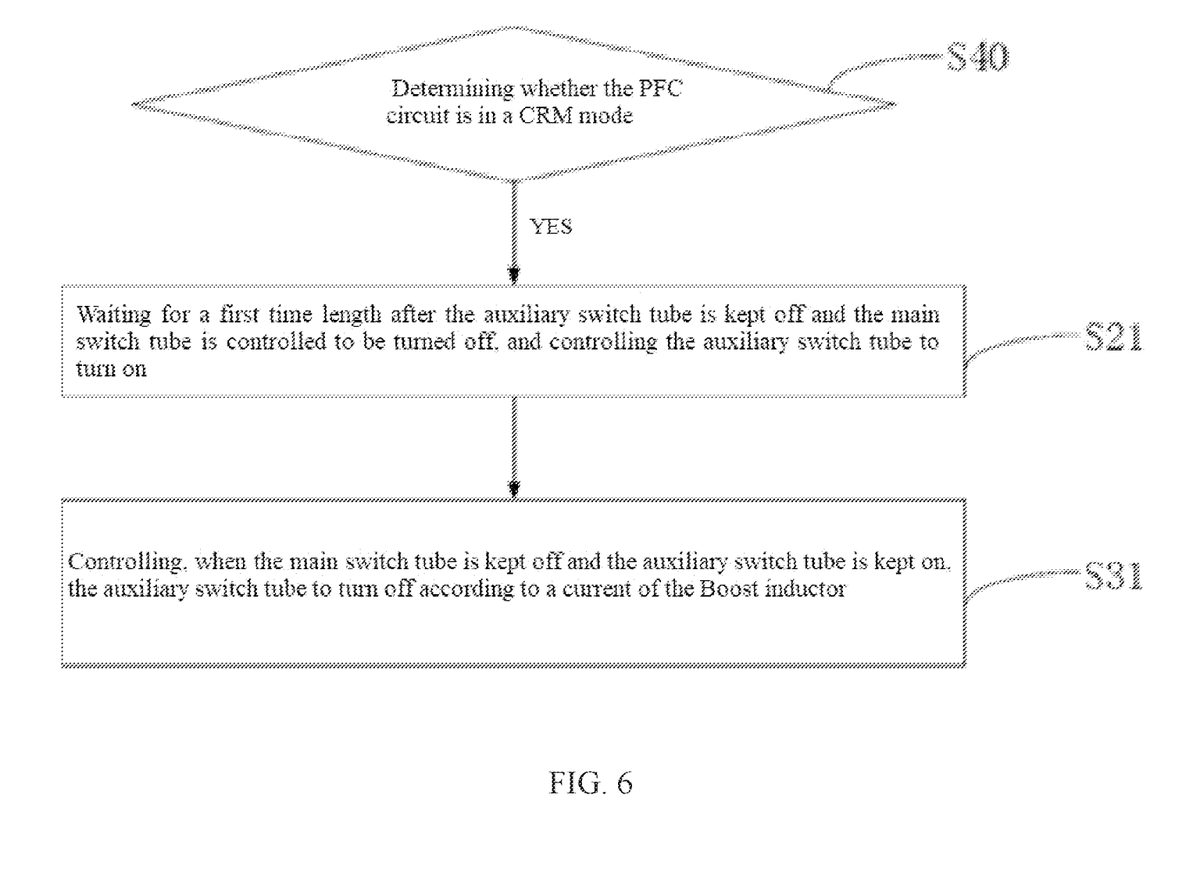
FIG. 6 is a second schematic flowchart of a control method for a PFC circuit in an embodiment of the present disclosure.

Please refer to FIG. 6, the control method may specifically include:

S40: determining whether the PFC circuit is in a CRM mode; and under the condition that the PFC circuit is in the CRM mode, then:

S21: after the auxiliary switch tube is kept off and the main switch tube is controlled to be turned off, waiting for a first time length and controlling the auxiliary switch tube to turn on; which may be understood as: in the CRM mode, step S20 includes step S21; and S31: when the main switch tube is kept off and the auxiliary switch tube is kept on, controlling the auxiliary switch tube to turn off according to the current of the boost inductor; which may be understood as: in the CRM mode, step S30 includes step S31.

The above step S31 may specifically include: after detecting a zero-crossing current of the boost inductor, waiting for a second time length, and controlling the auxiliary switch tube to turn off. In other examples, there is no need to wait, or the auxiliary switch tube is controlled to be turned off based on a detection result of the zero-crossing current and other detection results.

The CRM is specifically a critical conduction mode, and the CRM mode may be understood as the critical conduction mode.

Figure 7:
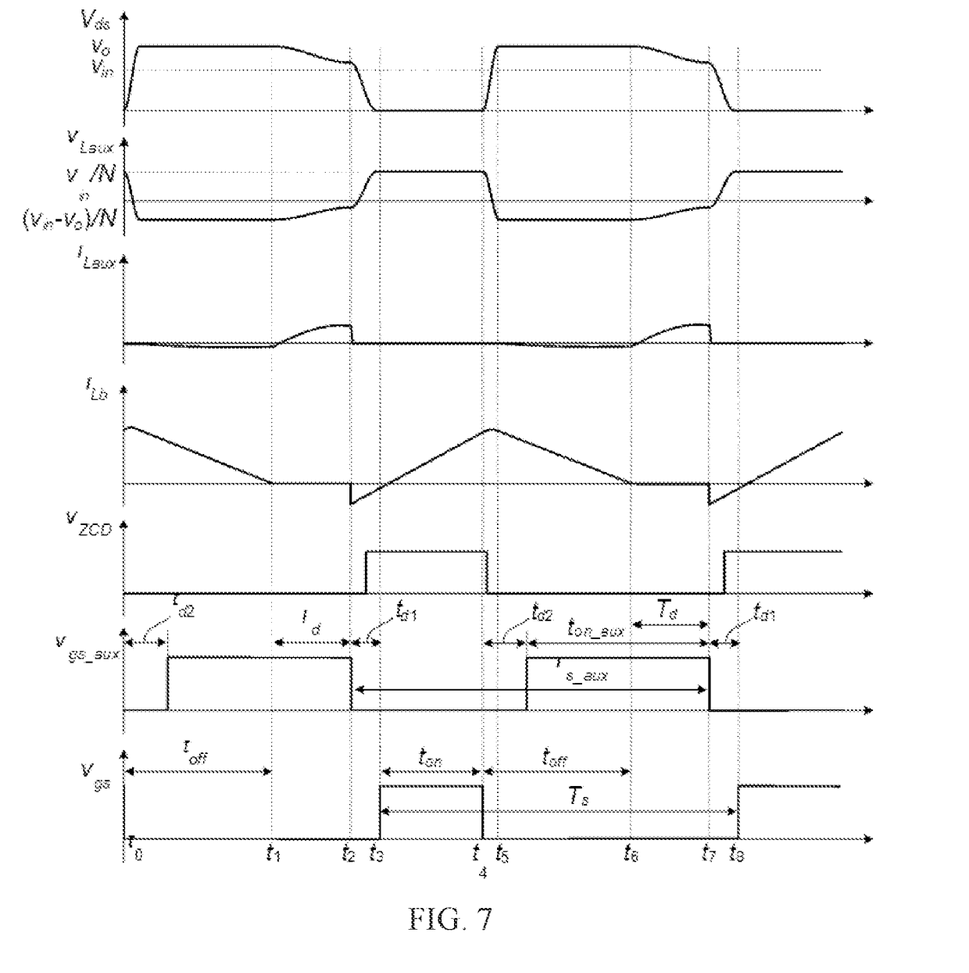
FIG. 7 is a waveform diagram in a CRM mode in an embodiment of the present disclosure.

In the waveform diagram shown in FIG. 7:

$V_o$ may be understood as a voltage output by the boost inductor, and may also be understood as a voltage of the output capacitor $C_o$;

$V_o$ may be understood as a voltage input by the boost inductor, and may also be understood as a voltage of the input capacitor $C_{in}$;

$V_{Laux}$ may be understood as a voltage of the auxiliary winding $L_{aux}$;

$V_{Lb}$ may be understood as a voltage of the boost inductor $L_b$;

$i_{Laux}$ may be understood as a current of the auxiliary winding $L_{aux}$;

$i_{Lb}$ may be understood as a current of the boost inductor $L_b$;

N may be understood as a ratio of coil turns between the boost inductor and the auxiliary winding, and may also be understood as the representation of a proportional relationship of the voltages;

$V_{ZCD}$ may be understood as the zero-crossing detection voltage;

$V_{gs}$ may be understood as a gate electrode signal of the main switch tube, and may also be understood as a gate-source voltage of the main switch tube; and $V_{gs\_aux}$ may be understood as a gate electrode signal of the auxiliary switch tube, and may also be understood as a gate-source voltage of the auxiliary switch tube.

Regarding step S21, it can be seen in conjunction with FIG. 7:

At moment $t_0$, the main switch tube $Q_b$ is turned off. At this time, the boost inductor $L_b$ releases energy, and the current of the boost inductor $L_b$ flows to the load $R_L$ through the output diode $D_b$. At this time, the body diode of the auxiliary switch tube $Q_{aux}$ is conducted, and after dead time $t_{d2}$ (i.e., the first time length involved above), the auxiliary switch tube $Q_{aux}$ is turned on.

During t0 to t1, the auxiliary winding $L_{aux}$ charges the clamping capacitor $C_{aux}$, and the charging stops when the voltage of the clamping capacitor $C_{aux}$ rises to be equal to the voltage of the auxiliary winding $L_{aux}$. The duration from t0 to t1 is time length $t_{off}$, which may be understood as a period of time before the current $i_{Lb}$ of the main switch tube $L_b$ crosses zero and after the main switch tube $L_b$ is turned off.

A value of the above first time length (the dead time $t_{d2}$) may be a period of time before the current $i_{Lb}$ of the main switch tube does not reach zero (for example, a period of time greater than 0.3 μs and less than the time length $t_{off}$), and its function may be, for example, that the auxiliary switch tube is conducted before the body diode and is then turned on, which can effectively reduce the loss and improve the efficiency.

Regarding step S31, it can be seen in conjunction with FIG. 7:

At moment t1, the current of the boost inductor $L_b$ drops to 0, the energy of the boost inductor $L_b$ is released completely, and delay turn-off of the auxiliary switch tube $Q_{aux}$ is started. Delay time $T_d$ may be understood as the second time length involved above, that is, during $t_1$ to $t_2$, during the delay time $T_d$, the clamping capacitor $C_{aux}$ releases energy to charge the auxiliary winding $L_{aux}$, and the current of the boost inductor $L_b$ is approximately kept at zero at this time.

At moment t2, the auxiliary switch tube $Q_{aux}$ is turned off, and the current of the boost inductor $L_b$ starts to flow to the input side. After the auxiliary switch tube $Q_{aux}$ is turned off, an output junction capacitor of the main switch tube $Q_b$ is discharged, and the source-drain voltage $V_{ds}$ of the main switch tube $Q_b$ decreases. When the source-drain voltage $V_{ds}$ decreases to a certain value, a ZCD signal is triggered (that is, the zero-crossing detection voltage $V_{ZCD}$ changes from low to high). After the control module 11 detects the ZCD signal, the main switch tube $Q_b$ is turned on before being delayed for a period of time.

During $t_2$ to $t_3$, the output junction capacitor of the main switch tube $Q_b$ is discharged and then the body diode is turned on, and the main switch tube $Q_b$ realizes ZVS (that is, the function of zero voltage switching). The duration from $t_2$ to $t_3$ is dead time $t_{d1}$ between the main switch tube $Q_b$ and the auxiliary switch tube $Q_{aux}$.

The function of the value of the second time length above (may also be understood as a value of the dead time $t_{d1}$) may be, for example, that since the switch tubes need time to be turned on and off, through the value, the main switch tube $Q_b$ and the auxiliary switch tube $Q_{aux}$ can be prevented from being turned on simultaneously as much as possible to achieve higher conversion efficiency. Any delay time $T_d$ and dead time $t_{d1}$ which are configured for this purpose are not deviated from the scope of the above solution.

At moment t3, the main switch tube $Q_b$ is turned on, the input voltage recharges the boost inductor $L_b$, and the current of the boost inductor $L_b$ starts to rise. At this time, a loop of the auxiliary winding is disconnected, and the current of the auxiliary winding is zero. The duration from $t_3$ to $t_4$ may be, for example, $t_{on}$, and the duration $t_{on}$ may be configured based on a general control principle of the main switch tube.

At moment t4, the main switch tube $Q_b$ is turned off, the boost inductor $L_b$ releases energy, the inductor current begins to decrease, and the auxiliary winding charges the clamping capacitor $C_{aux}$ through the body diode of the auxiliary switch tube $Q_{aux}$. After the dead time $t_{d2}$, the auxiliary switch tube $Q_{aux}$ is turned on to realize the ZVS (i.e., the function of zero-point voltage switching). A new repetition period starts at moment $t_5$.

Furthermore, the processing procedures from $t_4$ to $t_8$ may be understood with reference to the processing procedures from $t_0$ to $t_5$. In addition, a control period of the auxiliary switch tube may be understood as the period $T_{s\_aux}$ aux shown in the figure, and a control period of the main switch tube may be understood as the period $T_s$ shown in the figure.

It can be seen that in the above solution, an active clamping technology may be configured to achieve the ZVS (i.e., the function of zero-point voltage switching) within a full input voltage range of a single-phase Boost ITC conversion circuit (i.e., the above-mentioned PFC circuit), which further improves the conversion efficiency of the PFC circuit at high voltage input.

Figure 8:
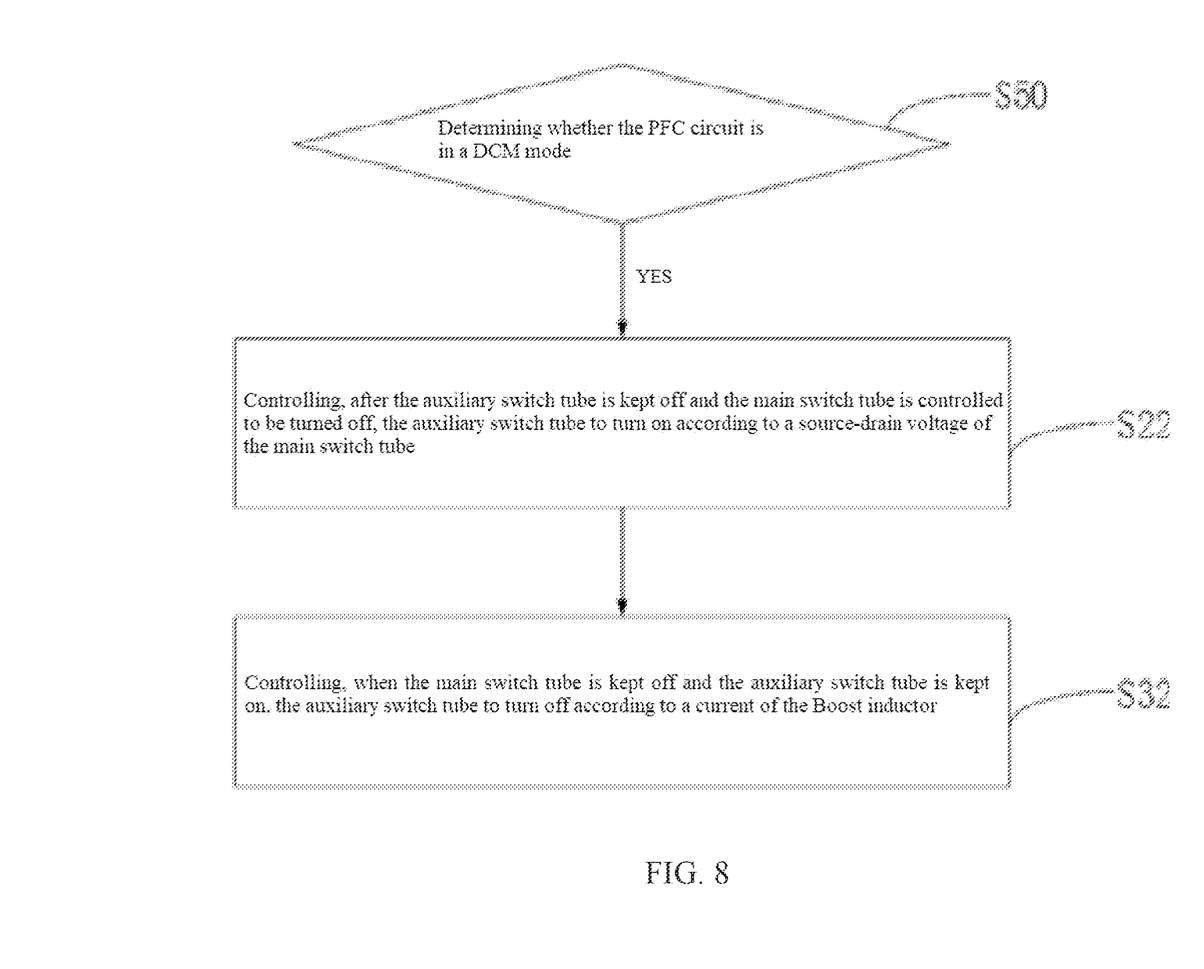
FIG. 8 is a third schematic flowchart of a control method for a PFC circuit in an embodiment of the present disclosure.

In one of the embodiments, please refer to FIG. 8, the control method implemented by the control module may further include:

S50: determining whether the PFC circuit is in a DCM mode; and under the condition that the PFC circuit is in the DCM mode, then:

S22: after the auxiliary switch tube is kept off and the main switch tube is controlled to be turned off, controlling the auxiliary switch tube to turn on according to the source-drain voltage of the main switch tube; which may be understood as: in the DCM mode, step S20 includes step S22; and S32: when the main switch tube is kept off and the auxiliary switch tube is kept on, controlling the auxiliary switch tube to turn off according to the current of the boost inductor, which may be understood as: in the DCM mode, step S30 includes step S32.

DCM is specifically a Discontinuous Conduction Mode, and the DCM mode may be understood as the discontinuous conduction mode.

Step S22 may specifically include: when detecting that the source-drain voltage oscillates for N bottoms and rises to a threshold voltage, controlling the auxiliary switch tube to turn on, wherein N may be an integer greater than or equal to 0 (for example, N can be 2). Or in other examples, after detecting multiple peaks, multiple zero crossings, and rising to the threshold voltage, the auxiliary switch tube is controlled to be turned on.

Figure 9:
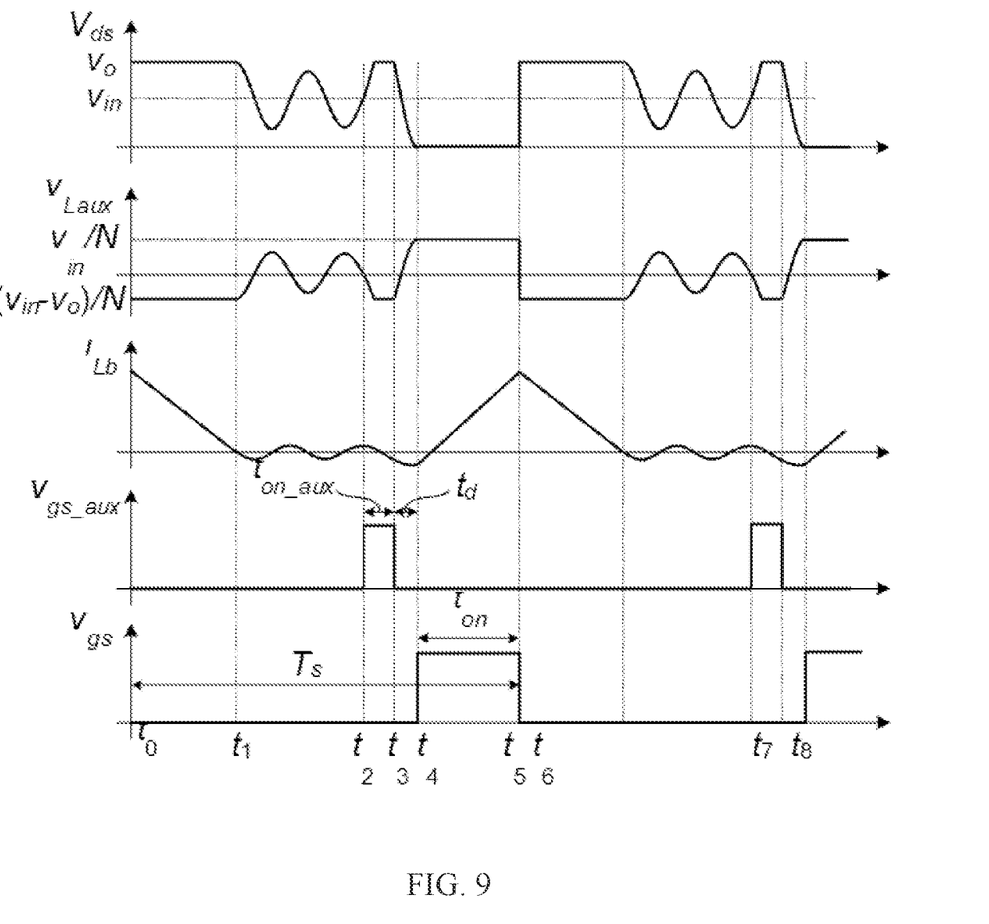
FIG. 9 is a waveform schematic diagram in a DCM mode in an embodiment of the present disclosure.

The threshold voltage is matched with an input voltage input to the boost inductor, which, for example, may be the input voltage $V_{in}$ shown in the figure, or any voltage higher than the input voltage $V_{in}$ or lower than the input voltage $V_{in}$ (for example, a voltage forming a certain difference and ratio). In addition, the voltage $V_{Laux}$ of the auxiliary winding may also be detected as a judgment basis to control the auxiliary switch tube to be turned on. For example, the judgment process of detecting that the source-drain voltage of the main switch tube oscillates for N bottoms and rises to the threshold voltage can be implemented by the judgment process of detecting that the source-drain voltage of the auxiliary switch tube oscillates for N peaks and drops to 0.

Regarding step S22, it can be seen in conjunction with FIG. 9:

At the moment $t_0$, the main switch tube $Q_b$ is turned off, the auxiliary switch tube $Q_{aux}$ is also in an off state at this time, the current of the boost inductor $L_b$ starts to decrease, and at this time, the auxiliary winding $L_{aux}$ charges the capacitor $C_{aux}$ through the body diode of the auxiliary switch tube $Q_{aux}$;

at the moment the current $t_1$, the current $i_{LB}$ of the boost inductor $L_b$ drops to 0, and the boost inductor $L_b$, the output junction capacitor of the main switch tube $Q_b$ and a junction capacitor of the boost diode $D_{Lb}$ start to enter a resonance process; and at the moment $t_2$, the auxiliary switch tube $Q_{aux}$ turned on, at this time, the clamping capacitor $C_{aux}$ charges the auxiliary winding $L_{aux}$, the energy of the auxiliary winding $L_{aux}$ will be coupled to the boost inductor $L_b$, since the energy is injected into the boost inductor $L_b$, the voltage of the output junction capacitor of the main switch tube $Q_b$ is charged to the output voltage $V_o$ and clamped at $V_o$ by the output diode $D_o$ (i.e., the Boost diode), and the boost inductor $L_b$ will resonate to a negative current in advance.

The time between $t_2$ and $t_0$ may be detected and controlled based on the above step S31.

In one of the embodiments, the process of step S32 may specifically include: after detecting the zero-crossing current of the boost inductor, waiting for a third time length, and controlling the auxiliary switch tube to turn off. The logic of selecting the third time length may be understood by referring to the logic of selecting the second time length above.

Regarding step S32, it can be seen in conjunction with FIG. 9:

at the moment $t_3$, the auxiliary switch tube $Q_{aux}$ is turned off, and the junction capacitor of the main switch tube $Q_b$ starts to discharge until the voltage drops to 0, and the body diode is turned on;

at the moment $t_4$, the main switch tube $Q_b$ is turned on, and the current of the boost inductor $L_b$ starts to rise; and at the moment the main switch tube $Q_b$ is turned off, and a new repetition period starts.

A turn-on time length of the auxiliary switch tube $Q_{aux}$ may be characterized as $t_{on\_aux}$, and a turn-on time length of the main switch tube $Q_b$ may be characterized as $t_{on}$.

The embodiment of the present disclosure provides a control method for a PFC circuit, which is the control method mentioned in the above optional solution.

In addition, in the above steps S20, S21, S22, S30, S31, and S32, the control process of the main switch tube $Q_b$ may be understood with reference to the related art. Any existing or improved manners in the art do not depart from the scope of the embodiments of the present disclosure.

In summary, in the PFC circuit and the control method thereof according to the present disclosure, through the mutual inductance between the auxiliary winding and the boost inductor, electric energy of the boost inductor can be coupled to the auxiliary winding, through appropriate control (for example, the control method of the optional solutions of the present disclosure is adopted), the function of zero voltage switching can be effectively guaranteed, and a higher conversion efficiency is guaranteed in the full voltage range. It can be seen that the present disclosure provides a circuit basis for realizing such a function.

Finally, it should be noted that the above embodiments are only configured to illustrate the technical solutions of the present disclosure, instead of limiting the same; although the present disclosure has been described in detail with reference to the foregoing embodiments, those of ordinary skill in the art should understand that the technical solutions recorded in the foregoing embodiments can still be modified, or some or all of the technical features can be equivalently replaced; and these modifications or replacements do not make the essence of the corresponding technical solutions depart from the scope of the technical solutions of the embodiments of the present disclosure.

What is claimed is:

1. A power factor correction (PFC) circuit, comprising: a boost inductor, an auxiliary winding, an auxiliary switch tube, a main switch tube, a clamping capacitor, a series resistor, and a control module,
   wherein
   the boost inductor and the auxiliary winding have mutual inductance,
   a first terminal of the auxiliary winding is connected to a first terminal of the auxiliary switch tube,
   a second terminal of the auxiliary switch tube is connected to a first terminal of the clamping capacitor,
   a second terminal of the clamping capacitor is connected to a first terminal of the series resistor,
   a second terminal of the series resistor is connected to a second terminal of the auxiliary winding,
   the main switch tube is connected between the boost inductor and a ground,
   the control module is respectively connected to a control terminal of the main switch tube and a control terminal of the auxiliary switch tube, wherein a state change of the auxiliary switch tube is related to a state change of the main switch tube, and
   the control module is configured so that when the auxiliary switch tube is kept off, the control module controls the auxiliary switch tube to turn on according to a turn-off action of the main switch tube, and when the auxiliary switch tube is kept on, the control module controls the auxiliary switch tube to turn off according to a current of the boost inductor;
   wherein the control module is specifically configured so that under a condition that the PFC circuit is in a CRM mode;
   after the auxiliary switch tube is kept off and the main switch tube is controlled to be turned off, the control module waits for a first time length, and then controls the auxiliary switch tube to turn on; and
   when the main switch tube is kept off and the auxiliary switch tube is kept on, the control module controls the auxiliary switch tube to turn off according to the current of the boost inductor.

2. The PFC circuit according to claim 1, further comprising: a rectifier module, an input capacitor, an output diode, and an output capacitor,
   wherein
   an input side of the rectifier module is configured to connect to a power source,
   an output side of the rectifier module is connected to a first terminal of the boost inductor and a first terminal of the input capacitor,
   a second terminal of the input capacitor is grounded,
   a second terminal of the boost inductor is connected to a positive electrode of the output diode and a drain electrode of the main switch tube,
   a source electrode of the main switch tube is grounded through a sampling resistor,
   a negative electrode of the output diode is connected to the output capacitor and a load, and
   a detection terminal of the control module is connected between the main switch tube and the boost inductor to collect a corresponding zero-crossing detection voltage.

3. The PFC circuit according to claim 1, wherein a power supply of the control module is provided by electric energy obtained by the auxiliary winding.

4. A control method for the PFC circuit according to claim 1, comprising:
   controlling, when the auxiliary switch tube is kept off, the auxiliary switch tube to turn on according to the turn-off action of the main switch tube; and
   controlling, when the auxiliary switch tube is kept on, the auxiliary switch tube to turn off according to the current of the boost inductor.

5. The control method according to claim 4, wherein the step of controlling, when the auxiliary switch tube is kept off, the auxiliary switch tube to turn on according to the turn-off action of the main switch tube comprises:
   under a condition that the PFC circuit is in a CRM mode:
   waiting for a first time length after the auxiliary switch tube is kept off and the main switch tube is controlled to be turned off, and controlling the auxiliary switch tube to turn on.

6. The control method according to claim 4, wherein the step of controlling, when the auxiliary switch tube is kept off, the auxiliary switch tube to turn on according to the turn-off action of the main switch tube comprises:
   under a condition that the PFC circuit is in a DCM mode:
   controlling, after the auxiliary switch tube is kept off and the main switch tube is controlled to be turned off, the auxiliary switch tube to turn on according to a source-drain voltage of the main switch tube.

7. The control method according to claim 6, wherein the step of controlling the auxiliary switch tube to turn on according to the source-drain voltage of the main switch tube comprises:
   controlling, when detecting that the source-drain voltage oscillates for N bottoms and rises to a threshold voltage, the auxiliary switch tube to turn on.

8. The control method according to claim 4, wherein the step of controlling, when the auxiliary switch tube is kept on, the auxiliary switch tube to turn off according to the current of the boost inductor comprises:
waiting for a third time length after detecting a zero-crossing current of the boost inductor, and controlling the auxiliary switch tube to turn off.

9. The method according to claim 4, wherein the PFC circuit further comprises: a rectifier module, an input capacitor, an output diode, and an output capacitor,
wherein
an input side of the rectifier module is configured to connect to a power source,
an output side of the rectifier module is connected to a first terminal of the boost inductor and a first terminal of the input capacitor,
a second terminal of the input capacitor is grounded,
a second terminal of the boost inductor is connected to a positive electrode of the output diode and a drain electrode of the main switch tube,
a source electrode of the main switch tube is grounded through a sampling resistor,
a negative electrode of the output diode is connected to the output capacitor and a load, and
a detection terminal of the control module is connected between the main switch tube and the boost inductor to collect a corresponding zero-crossing detection voltage.

10. The method according to claim 4, wherein a power supply of the control module is provided by electric energy obtained by the auxiliary winding.

11. The PFC circuit according to claim 1, wherein when controlling the auxiliary switch tube to turn off according to the current of the boost inductor in the CRM mode, the control module is specifically configured so that after detecting a zero-crossing current of the boost inductor, the control module waits for a second time length, and then controls the auxiliary switch tube to turn off.

12. A power factor correction (PFC) circuit, comprising: a boost inductor, an auxiliary winding, an auxiliary switch tube, a main switch tube, a clamping capacitor, a series resistor, and a control module,
wherein
the boost inductor and the auxiliary winding have mutual inductance,
a first terminal of the auxiliary winding is connected to a first terminal of the auxiliary switch tube,
a second terminal of the auxiliary switch tube is connected to a first terminal of the clamping capacitor,
a second terminal of the clamping capacitor is connected to a first terminal of the series resistor,
a second terminal of the series resistor is connected to a second terminal of the auxiliary winding,
the main switch tube is connected between the boost inductor and a ground,
the control module is respectively connected to a control terminal of the main switch tube and a control terminal of the auxiliary switch tube, wherein a state change of the auxiliary switch tube is related to a state change of the main switch tube, and
the control module is configured so that when the auxiliary switch tube is kept off, the control module controls the auxiliary switch tube to turn on according to a turn-off action of the main switch tube, and when the auxiliary switch tube is kept on, the control module controls the auxiliary switch tube to turn off according to a current of the boost inductor;

wherein the control module is specifically configured so that under a condition that the PFC circuit is in a DCM mode:
after the auxiliary switch tube is kept off and the main switch tube is controlled to be turned off, the control module controls the auxiliary switch tube to turn on according to a source-drain voltage of the main switch tube; and
when the main switch tube is kept off and the auxiliary switch tube is kept on, the control module controls the auxiliary switch tube to turn off according to the current of the boost inductor.

13. The PFC circuit according to claim 12, wherein when controlling the auxiliary switch tube to turn on according to the source-drain voltage of the main switch tube, the control module is specifically configured so that when detecting that the source-drain voltage oscillates for N bottoms and rises to a threshold voltage, the control module controls the auxiliary switch tube to turn on.

14. The PFC circuit according to claim 13, wherein the threshold voltage is matched with an input voltage input to the boost inductor.

15. The PFC circuit according to claim 12, wherein when controlling the auxiliary switch tube to turn off according to the current of the boost inductor in the DCM mode, the control module is specifically configured so that after detecting a zero-crossing current of the boost inductor, the control module waits for a third time length, and controls the auxiliary switch tube to turn off.

16. A control method for a rower factor correction (PFC) circuit, the PFC circuit comprising: a boost inductor, an auxiliary winding, an auxiliary switch tube, a main switch tube, a clamping capacitor, a series resistor, and a control module,
wherein
the boost inductor and the auxiliary winding have mutual inductance,
a first terminal of the auxiliary winding is connected to a first terminal of the auxiliary switch tube,
a second terminal of the auxiliary switch tube is connected to a first terminal of the clamping capacitor,
a second terminal of the clamping capacitor is connected to a first terminal of the series resistor,
a second terminal of the series resistor is connected to a second terminal of the auxiliary winding,
the main switch tube is connected between the boost inductor and a ground,
the control module is respectively connected to a control terminal of the main switch tube and a control terminal of the auxiliary switch tube, wherein a state change of the auxiliary switch tube is related to a state change of the main switch tube, and
the control module is configured so that when the auxiliary switch tube is kept off, the control module controls the auxiliary switch tube to turn on according to a turn-off action of the main switch tube, and when the auxiliary switch tube is kept on, the control module controls the auxiliary switch tube to turn off according to a current of the boost inductor;
the control method comprising:
controlling, when the auxiliary switch tube is kept off, the auxiliary switch tube to turn on according to the turn-off action of the main switch tube; and
controlling, when the auxiliary switch tube is kept on, the auxiliary switch tube to turn off according to the current of the boost inductor;

wherein the step of controlling, when the auxiliary switch tube is kept on, the auxiliary switch tube to turn off according to the current of the boost inductor comprises:

under a condition that the PFC circuit is in a CRM mode:

controlling, when the main switch tube is kept off and the auxiliary switch tube is kept on, the auxiliary switch tube to turn off according to the current of the boost inductor.

17. The control method according to claim 16, wherein the step of controlling, when the PFC circuit is in the CRM mode, the auxiliary switch tube to turn off according to the current of the boost inductor comprises:

waiting for a second time length after detecting a zero-crossing current of the boost inductor, and controlling the auxiliary switch tube to turn off.

* * * * *